(No Model.)
2 Sheets—Sheet 1.
A. G. DUNCAN.
GATE.
No. 595,377. Patented Dec. 14, 1897.
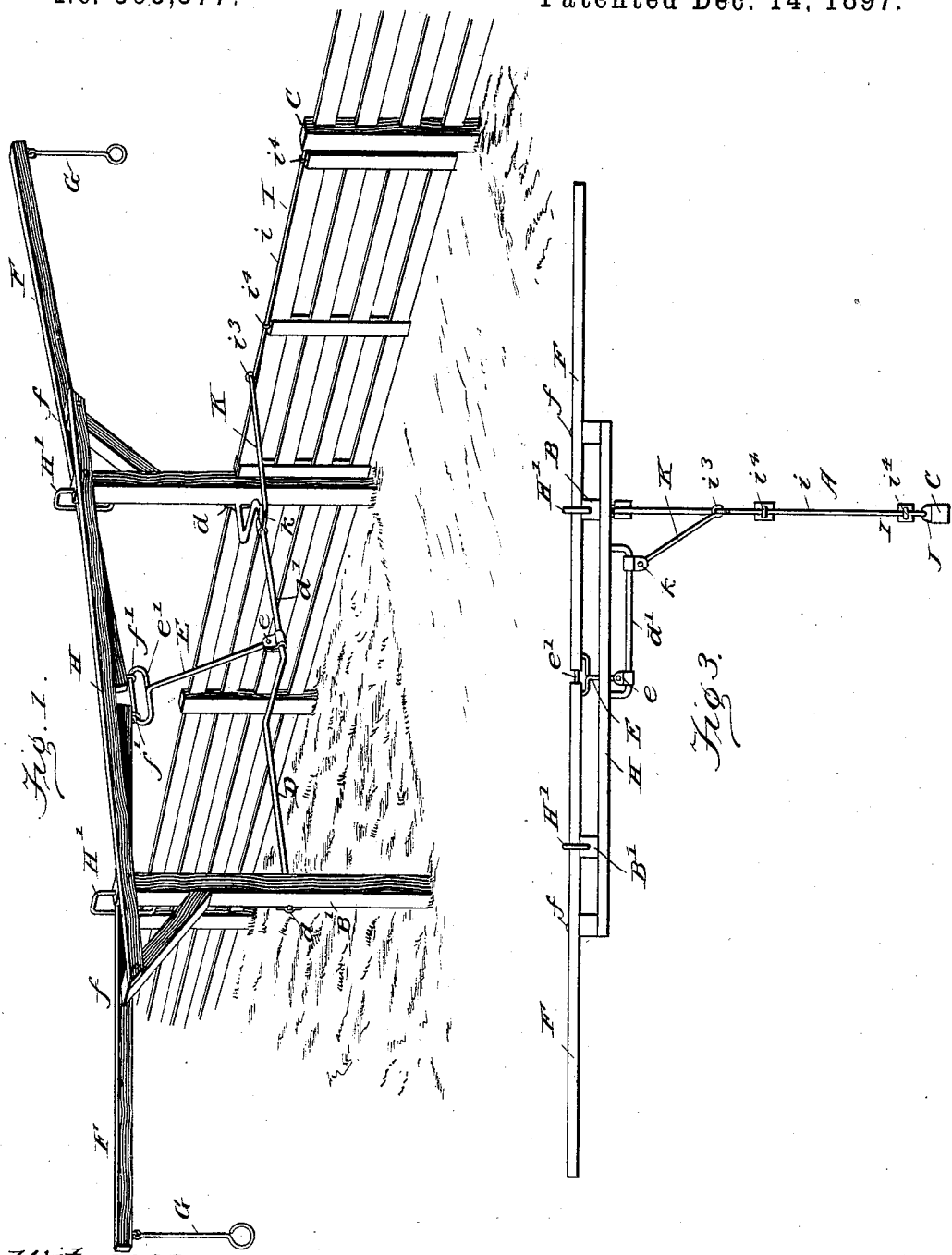
Witnesses
C. J. Parks.
G. M. Copenhaver.
Inventor
Alexander G. Duncan.
By J. R. Littell
his Attorney (No Model.) 2 Sheets—Sheet 2.
A. G. DUNCAN.
GATE.
No. 595,377. Patented Dec. 14, 1897.
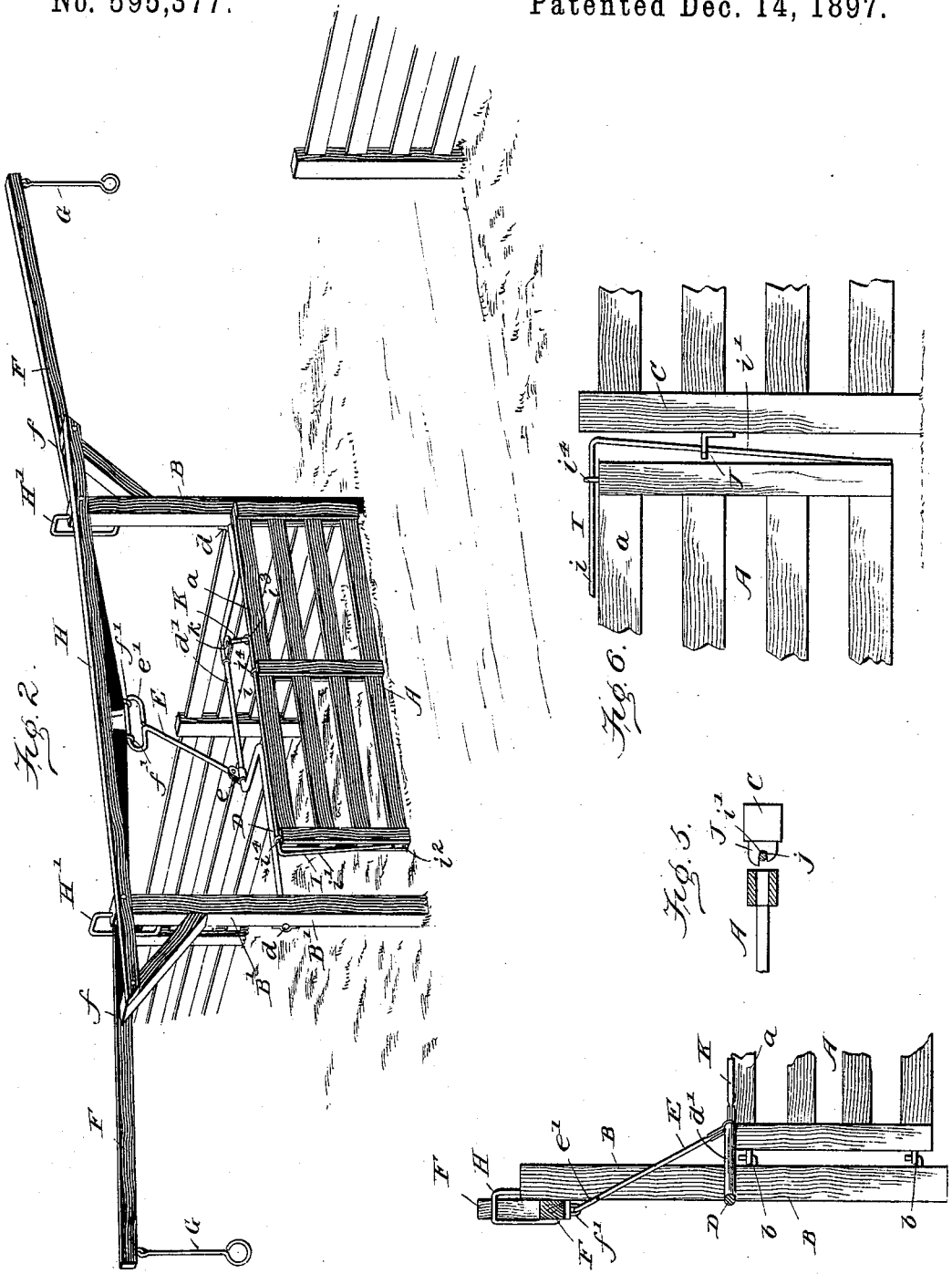
Witnesses
C. J. Parks.
G. M. Copenhaver
Inventor
Alexander G. Duncan
By J. R. Littell
his Attorney

UNITED STATES PATENT OFFICE.

ALEXANDER GEORGE DUNCAN, OF RYAN, IOWA.

GATE.

SPECIFICATION forming part of Letters Patent No. 595,377, dated December 14, 1897.

Application filed November 30, 1896. Serial No. 613,961. (No model.)

*To all whom it may concern:*

Be it known that I, ALEXANDER GEORGE DUNCAN, a citizen of the United States, residing at Ryan, in the county of Delaware and State of Iowa, have invented a new and useful Gate, of which the following is a specification.

This invention relates to that class of gates which are adapted to be opened and operated from a vehicle by means of a lever mechanism elevated upon posts and controlling the operation of the gate.

The object of my invention is to provide a simple and improved gate of this class which will possess advantages in point of convenience, ease of operation, simplicity, direct action, effectiveness, and general efficiency.

In the drawings, Figure 1 is a perspective view of my improved gate, showing the same in closed position. Fig. 2 is a corresponding view illustrating the operation. Fig. 3 is a top or plan view. Figs. 4, 5, and 6 are detail views.

Referring to the drawings, A designates the gate proper, which may be in the main of any suitable or desired construction. The gate is mounted upon the hinge-post B by means of hinges $b\ b$, and at the outer end of the gate is provided a latch-post C.

The hinge-post B is extended vertically to a suitable height, and a corresponding post B' is provided in relation to the post B on a transverse plane with respect to the closed position of the gate. Between the posts B and B' is mounted a crank-shaft D, having bearings $d\ d$ upon the respective posts and having its crank $d'$ intermediately located. The crank-shaft D is thus approximately at right angles to the closed position of the gate, and its crank $d'$ normally projects inwardly in the direction of the gate. The crank portion $d'$ is preferably of square or angular contour to provide a somewhat extended crank, as shown.

E designates a connecting-rod which is pivotally connected at its lower end to the crank $d'$, as shown at $e$, and has its upper end pivotally connected with the inner ends of two levers F F, fulcrumed upon the respective posts B and B', as shown at $f\ f$. The connection of the rod E with the crank $d'$ is preferably formed by an eye $e$, embracing the crank-shaft. The connection between the rod E and the levers F is preferably formed by an extended transverse loop $e'$ at the top, embraced by eyes or rings $f'$ on the inner ends of the levers, which rings are thus adapted to slide upon said extended loop. At the outer ends of the levers are provided pivotally-mounted depending rods G, by which the levers may be conveniently operated from a vehicle.

The posts B and B' are preferably connected at their top by a cross-piece H, and brackets H' H' may be provided upon the posts B and B', which brackets embrace the levers, as shown.

The gate is provided with a spring-latch I, preferably formed of a right-angular spring rod or plate, the main arm of which, $i$, extends above the top bar $a$ of the gate in guides $i^4\ i^4$, while the front arm $i'$ projects at the front edge of the gate and is secured thereto at its lower end, as at $i^2$, and is adapted to engage an inwardly-projecting horizontal plate J, mounted upon the latch-post C and provided with a recess $j$, adapted to receive the spring $i'$.

While I prefer to employ the form of spring-latch herein described, any other suitable or adapted form of latch may be employed in connection with my invention.

Pivotally connected to the rear end $i^3$ of the top arm $i$ of the spring-latch is a rod K, having its outer end extended to and connected with the crank $d'$, as at $k$. This connection is preferably formed by means of an eye or loop $k$, pivotally connected with the rod K and embracing the crank-shaft.

The crank-shaft D is mounted at a height which will bring its crank $d'$ approximately on a horizontal plane with the top of the gate when the crank is in normal position.

When either one of the levers G are operated to throw its inner end first up and then down, the crank $d'$ is thrown over to reverse position, thus through the medium of the connecting-rod K drawing the spring-latch I from engagement with the latch-plate J and by its continued movement swinging the gate around and open to a position approximately parallel with the crank-shaft. Then by operating the opposite lever F the crank $d'$ is carried back again to normal position and causes the closing and latching of the gate by reverse movement. It will be noted that the crank-shaft is mounted at right angles to the normal closed position of the gate and that the posts B and B' and the crank-shaft are arranged at that side of the gate toward which the swinging movement is made. The gate thus always swings open toward one side, and the relative arrangement of the posts B and B' and the levers is such that either of the levers can be conveniently operated from the vehicle without interference by the gate with the latter.

My invention is especially adapted for convenient attachment to various forms of farm-gates which are mounted and adapted to swing open upon hinges.

Having thus described my invention, I claim and desire to secure by Letters Patent—

1. An improved gate of the class described, comprising the hinge-post, the gate hinged thereto, the outer post relatively mounted with the hinge-post on an approximately transverse plane with relation to the gate, the shaft mounted upon and extending between the hinge-post and outer post and provided with the central or intermediate crank, the operating-levers fulcrumed upon said posts, the connecting-rod extending from the crank of the shaft to the operating-levers, and a connecting-rod extending from the crank of the shaft to latch mechanism upon the gate, substantially as and for the purpose set forth.

2. An improved gate of the class described, comprising the hinge-post B, the gate hinged thereto, the outer post B', the crank-shaft D having the crank $d'$ and mounted between said posts, the crank-shaft being at approximately right angles to the gate and at one side of the latter, the levers F fulcrumed at the top of said posts, the connecting-rod E extending from the crank $d'$ to the inner ends of the levers, the spring-rod or plate-latch I, and the connecting-rod K extending between the crank $d'$ and the end of the latch-plate, substantially as and for the purpose set forth.

In testimony whereof I affix my signature in presence of two witnesses.

ALEXANDER GEORGE DUNCAN.

Witnesses:
  WM. MICHAEL,
  J. M. DUNCAN.